United States Patent
Kitamura et al.

(10) Patent No.: US 9,926,385 B2
(45) Date of Patent: Mar. 27, 2018

(54) METHOD FOR PRODUCING WATER-SOLUBLE CELLULOSE ETHER HAVING LOW DEGREE OF POLYMERIZATION AND METHOD FOR PRODUCING FILM COATING COMPOSITION COMPRISING SAME

(71) Applicant: Shin-Etsu Chemical Co., Ltd., Tokyo (JP)

(72) Inventors: Akira Kitamura, Niigata-ken (JP); Mitsuo Narita, Niigata-ken (JP); Takuya Yokosawa, Niigata-ken (JP); Yuichi Nishiyama, Niigata-ken (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 148 days.

(21) Appl. No.: 14/447,846

(22) Filed: Jul. 31, 2014

(65) Prior Publication Data
US 2015/0040798 A1 Feb. 12, 2015

(30) Foreign Application Priority Data
Aug. 12, 2013 (JP) ................. 2013-167528

(51) Int. Cl.
| | |
|---|---|
| *C08B 11/20* | (2006.01) |
| *C09D 101/28* | (2006.01) |
| *C08B 1/06* | (2006.01) |
| *C08B 1/08* | (2006.01) |
| *C08B 11/00* | (2006.01) |
| *C08B 15/00* | (2006.01) |
| *C09D 101/26* | (2006.01) |
| *D21C 9/00* | (2006.01) |
| *D21H 15/02* | (2006.01) |
| *D21H 19/34* | (2006.01) |
| *D21H 19/52* | (2006.01) |

(52) U.S. Cl.
CPC ............... *C08B 11/20* (2013.01); *C08B 1/06* (2013.01); *C08B 1/08* (2013.01); *C08B 11/00* (2013.01); *C08B 15/00* (2013.01); *C09D 101/26* (2013.01); *C09D 101/284* (2013.01); *D21C 9/004* (2013.01); *D21C 9/007* (2013.01); *D21H 15/02* (2013.01); *D21H 19/34* (2013.01); *D21H 19/52* (2013.01)

(58) Field of Classification Search
CPC ............................ C08B 11/20; C09D 101/284
USPC ........................................................ 536/85
See application file for complete search history.

(56) References Cited

U.S. PATENT DOCUMENTS

| | | | |
|---|---|---|---|
| 4,061,859 A | 12/1977 | Cheng | |
| 5,476,668 A * | 12/1995 | Kobayashi | ............... C08B 11/00 424/488 |
| 6,133,170 A | 10/2000 | Suenaga et al. | |
| 6,306,333 B1 | 10/2001 | Rosenberg et al. | |
| 6,884,883 B1 | 4/2005 | Shima et al. | |
| 2010/0037628 A1* | 2/2010 | Hatanaka | ............... B65D 83/36 62/46.1 |
| 2010/0063269 A1 | 3/2010 | Mallon | |

FOREIGN PATENT DOCUMENTS

| | | |
|---|---|---|
| CN | 1287195 A | 3/2001 |
| DE | 198 02 383 A1 | 7/1998 |
| EP | 0 497 985 A1 | 8/1992 |
| EP | 1 903 059 A2 | 3/2008 |
| JP | S52-152985 A | 12/1977 |
| JP | 04-293901 A | 10/1992 |
| JP | 2003-503557 | 1/2003 |
| JP | 2003-508597 A | 3/2003 |
| JP | 2009-540098 A | 11/2009 |
| WO | WO 92/03167 A1 | 3/1992 |
| WO | WO 00/32637 A1 | 6/2000 |
| WO | WO 01/00680 A1 | 1/2001 |
| WO | WO 01/018062 A1 | 3/2001 |
| WO | WO 2007/145709 A1 | 12/2007 |
| WO | WO 2009/070168 A1 | 6/2009 |
| WO | WO 2013/109659 A1 | 7/2013 |

OTHER PUBLICATIONS

European Search Report for Application No. 14 179 920.5 dated Dec. 19, 2014.
Office Action for corresponding Chinese Patent Application No. 201410389970.5 dated May 5, 2016 with English translation, 12 pages.

* cited by examiner

*Primary Examiner* — Shaojia Anna Jiang
*Assistant Examiner* — Michael C Henry
(74) *Attorney, Agent, or Firm* — Alston & Bird LLP

(57) ABSTRACT

Provided are a method for producing a water-soluble cellulose ether having a low degree of polymerization and enhanced whiteness, and the like. The method includes the steps of: bringing a pulp powder having a multiplication product of less than 0.004 $mm^2$ which is obtained by multiplying a number-average fiber length by a number-average fiber width, each measured with a Kajaani fiber length analyzer, into contact with an alkali metal hydroxide to obtain an alkali cellulose; reacting the alkali cellulose with an etherifying agent to obtain a crude water-soluble cellulose ether having a high degree of polymerization; purifying the crude water-soluble cellulose ether; drying the purified water-soluble cellulose ether; grinding the dried water-soluble cellulose ether into a water-soluble cellulose ether powder; and depolymerizing the water-soluble cellulose ether powder to obtain the water-soluble cellulose ether having a low degree of polymerization.

16 Claims, No Drawings

METHOD FOR PRODUCING WATER-SOLUBLE CELLULOSE ETHER HAVING LOW DEGREE OF POLYMERIZATION AND METHOD FOR PRODUCING FILM COATING COMPOSITION COMPRISING SAME

FIELD

The present invention relates to a method for producing a water-soluble cellulose ether having a low degree of polymerization obtained by depolymerization of a water-soluble cellulose ether having a high degree of polymerization and a method for producing a film coating composition comprising the water-soluble cellulose ether having a low degree of polymerization.

BACKGROUND

A water-soluble cellulose ether differs greatly depending on a degree of polymerization or a viscosity in a solution thereof so that the degree of polymerization is adjusted to the intended use thereof. For example, when a water-soluble cellulose ether is used as a film coating composition, a water-soluble cellulose ether having a low degree of polymerization obtained by depolymerization of a water-soluble cellulose ether having a high degree of polymerization should be used in order to obtain a high concentration of coating solution. Also when a water-soluble cellulose ether is used as a stabilizer in suspension polymerization, a water-soluble cellulose ether having a low degree of polymerization is commonly used.

A water-soluble cellulose ether having a low degree of polymerization can be obtained by depolymerization of a water-soluble cellulose ether having a high degree of polymerization produced by converting a refined pulp to an alkali cellulose, reacting the alkali cellulose with an added etherifying agent, purifying the reaction product, drying and grinding.

A known depolymerization method includes an acid-catalyzed hydrolysis method using hydrogen chloride and an oxidative degradation method using hydrogen peroxide. However, these methods have the drawback that the cellulose ethers thus obtained commonly become yellow. In depolymerization through acid-catalyzed hydrolysis, examples of a method for enhancing whiteness of water-soluble cellulose ether having a low degree of polymerization include a method of using pulp having a low copper number (WO 92/03167), a method of mixing two or more batches of water-soluble cellulose ethers having low degrees of polymerization to adjust the pH value of the resulting mixture to from 4 to 6.8 (JP 2003-503557T, which is a Japanese phase publication of WO 01/000680), and a method of bringing a cellulose ether into contact with an acid in a diluent for partial depolymerization (JP 2009-540098T, which is a Japanese phase publication of WO 2007/145709).

Examples of depolymerization through oxidative degradation include depolymerization with an ozone gas (JP 4-293901A), and depolymerization through a combination of acid-catalyzed hydrolysis and oxidative degradation in which the acid-catalyzed hydrolysis is carried out in a thick aqueous slurry at a temperature above the agglomeration temperature of cellulose ether (JP 2003-508597T, which is a Japanese phase publication of WO 01/018062).

Further, there is a method of bringing a cellulose ether into contact with a hydrogen chloride gas or another hydrogen halide gas to suppress yellowing of a depolymerization product in the presence of a sulfur dioxide gas (JP 52-152985A).

SUMMARY

The method of enhancing whiteness of water-soluble cellulose ether having a low degree of polymerization described in WO 92/03167 requires a change in the step of refining a pulp, which is a raw material of the cellulose ether, to obtain a pulp having a low copper number, thereby leading to a cost increase. The method described in JP 2003-503557T is not preferred from the standpoint of production management because it requires a complicated step including neutralization for pH adjustment. Further, in the method described in JP 2009-540098T, depolymerization is performed in a diluent such as isopropyl alcohol so that a step of separating the diluent from a product is required after the depolymerization. In the method described in JP 4-293901A, an expensive apparatus is required for generating ozone, which also leads to the increased running cost. The method described in JP 2003-508597T requires a step of washing a depolymerization product with an aqueous solution of a basic salt because depolymerization is carried out in a slurry. The method described in JP 52-152985A is not suited particularly for medicinal use because sulfur dioxide introduced in the step of depolymerization generates a new by-product derived from a sulfur-containing compound.

Accordingly, there is a demand for the development of a method for enhancing whiteness of cellulose ether having a low degree of polymerization without introducing a new apparatus or adding a complicated step.

With a view to achieving the above-mentioned object, the present inventors have carried out an intensive investigation. As a result, it has been found that a water-soluble cellulose ether having a high degree of polymerization produced by using, as a raw material, a pulp powder having a multiplication product of less than 0.004 mm$^2$, which is obtained by multiplying the number-average fiber length by the number-average fiber width each measured with a Kajaani fiber length analyzer, is depolymerized to form a water-soluble cellulose ether having a low degree of polymerization and increased whiteness with less yellowing, leading to the completion of the invention.

According to the invention, there is provided a method for producing a water-soluble cellulose ether having a low degree of polymerization comprising the steps of: bringing a pulp powder having a multiplication product of less than 0.004 mm$^2$, which is obtained by multiplying a number-average fiber length by a number-average fiber width, each measured using a Kajaani fiber length analyzer, into contact with an alkali metal hydroxide to obtain an alkali cellulose; reacting the alkali cellulose with an etherifying agent to obtain a crude water-soluble cellulose ether having a high degree of polymerization; purifying the crude water-soluble cellulose ether having a high degree of polymerization; drying the purified water-soluble cellulose ether having a high degree of polymerization; grinding the dried water-soluble cellulose ether having a high degree of polymerization into a water-soluble cellulose ether powder having a high degree of polymerization; and depolymerizing the water-soluble cellulose powder having a high degree of polymerization into the water-soluble cellulose ether having a low degree of polymerization. According to the invention, there is also provided a method for producing a film coating composition comprising the respective steps of the method for producing a water-soluble cellulose ether having a low degree of polymerization and further comprising a step of dissolving the produced water-soluble cellulose ether having a low degree of polymerization in a solvent.

According to the invention, a water-soluble cellulose ether having a low degree of polymerization and high whiteness with less yellowing even after depolymerization of a water-soluble cellulose ether having a high degree of polymerization can be provided together with a film coating composition comprising the water-soluble cellulose ether having a low degree of polymerization.

DETAILED DESCRIPTION

A type of wood usable in the invention is not particularly limited. A wood having a small pulp fiber width such as hardwood including eucalyptus and maple is preferred.

The intrinsic viscosity, which is an indicator of the degree of polymerization of pulp, is preferably less than 900 ml/g, more preferably less than 800 ml/g, particularly preferably less than 700 ml/g, each as measured by the viscosity measurement method specified in Japanese Industrial Standards (JIS) P8215. When the intrinsic viscosity is 900 ml/g or more, a pulp sheet itself may have low whiteness so that a water-soluble cellulose ether having a low degree of polymerization in powder form obtained in a later step may have low whiteness. The lower limit of the intrinsic viscosity is preferably 300 ml/g.

The intrinsic viscosity [η] is measured in the following manner.

For example, a pulp sample is placed in a vessel in such an amount that a [η]c value obtained later will fall within a range of 3.0±0.1, and subjected to addition of 25 ml of distilled water, and further addition of several copper wire pieces. The vessel is sealed with a stopper and shaken until the pulp is completely broken down. Next, after 25.0 ml of a copper ethylenediamine solution is added thereto and air is removed, the vessel is hermetically sealed. The sample solution and a capillary viscometer are adjusted to 25.0° C., and the sample solution is introduced into the viscometer. The efflux time $t_n$ is measured and a viscosity ratio $\eta_{rel}$ is calculated from the following equation:

$$\eta_{rel} = h t_n$$

wherein h represents a viscometer constant determined using a calibration viscometer, a sample-measuring viscometer, and a glycerol solution.

By using a numerical table attached to JIS P8215, [η]c is read from $\eta_{rel}$. Separately, the concentration c (absolute dry pulp concentration) g/ml of the sample solution is calculated, and a value obtained by dividing [η] by c is designated as an intrinsic viscosity [η] ml/g.

According to invention, the pulp powder is obtained by grinding a pulp sheet in such a manner that a multiplication product obtained by multiplying a number-average fiber length by a number-average fiber length falls within a predetermined range. A pulp grinder is not particularly limited as long as the multiplication product of a number-average fiber length and a number-average fiber width becomes less than 0.004 mm² after grinding of the pulp. Examples of the grinder include a knife mill, a cutting mill, a hammer mill and a vertical roller mill.

The multiplication product of a number-average fiber length and a number-average fiber width of the pulp powder after grinding is less than 0.004 mm². When the multiplication product of a number-average fiber length and a number-average fiber is more than 0.004 mm², the water-soluble cellulose ether having a low degree of polymerization obtained in powder form in a subsequent step has reduced whiteness. The lower limit of the multiplication product of a number average fiber length and a number average fiber width is not particularly limited, and is preferably 0.001 mm². When the multiplication product is less than 0.001 mm², there is a possibility that marked improvement may not occur in the whiteness of the water-soluble cellulose ether having a low degree of polymerization in powder form, a large energy may be necessary for obtaining the pulp powder, and in addition, production efficiency may decrease.

The number-average fiber length and the number-average fiber width of the pulp powder after grinding are variable depending on the type of wood. The number-average fiber length is preferably from 0.05 to 0.6 mm, particularly preferably from 0.1 to 0.3 mm. The number-average fiber width is preferably from 0.005 to 0.050 mm, particularly preferably 0.01 to 0.04 mm.

The number-average fiber length and the number-average fiber width can be measured in accordance with JIS P8226 by dispersing the pulp powder sufficiently in a diluent, setting 50 ml of the resulting dispersion in a Kajaani fiber length analyzer (produced by Metso Automation), and conducting a predetermined operation. The number-average fiber length and the number-average fiber width may be measured by an image processing unit installed in the Kajaani fiber length analyzer, the unit conducting fiber length analysis using image processing.

A loose bulk density of the pulp powder after grinding can be obtained by filling a cup of a predetermined volume with a sample and then weighing. The loose bulk density is preferably from 70 to 300 g/l, more preferably from 70 to 200 g/l, still more preferably from 70 to 115 g/l. When the loose bulk density is less than 70 g/l, efficient production may be prevented because in many cases, a sufficient amount of such pulp cannot be placed in a reactor. In addition, it may be difficult to obtain a pulp powder having a loose bulk density of more than 300 g/l in view of the industrial level.

The weight-average particle size $D_{50}$ of the pulp powder obtained by grinding is preferably 250 μm or less, more preferably from 30 to 230 μm, still more preferably from 30 to 225 μm. When the weight-average particle size $D_{50}$ is more than 250 μm, a loose bulk density of the pulp powder may be reduced markedly and in addition, fluidity of the powder in a reactor may be reduced. When the weight-average particle size $D_{50}$ is less than 30 μm, industrial inefficiency may be reduced. The weight-average particle size $D_{50}$ of the pulp powder obtained by grinding is determined by placing, on a ro-tap sieve shaker, a plurality of test sieves different in openings in accordance with JIS Z8801, putting the pulp powder on the top sieve, vibrating or tapping it to sift the powder, weighing the powder on or under each sieve to find a weight distribution, and designating an average particle size at 50% in the cumulative distribution as the weight-average particle size.

The pulp powder obtained by grinding in a grinder may be brought into contact with an alkali metal hydroxide solution in a conventional manner to obtain an alkali cellulose. The step of bringing the pulp powder into contact with an alkali metal hydroxide solution is preferably carried out in a reactor having an internal stirring structure. The alkali metal hydroxide is not particularly limited. The alkali metal hydroxide is preferably sodium hydroxide from the standpoint of cost.

The concentration of the alkali metal hydroxide solution is preferably from 10 to 60% by weight, more preferably from 20 to 50% by weight. When the concentration of the alkali metal hydroxide solution is less than 10% by weight, the reaction efficiency of etherification conducted later may be reduced owing to rich water content in the alkali cellulose. When the concentration of the alkali metal hydroxide solution is more than 60% by weight, the alkali distribution in the alkali cellulose may become uneven and thereby deteriorate the transparency of the cellulose ether solution, making the solution unsuitable for use in film coating.

A weight ratio of the alkali metal hydroxide to the cellulose in the alkali cellulose can be changed appropriately, depending on the intended degree of substitution of ether groups. The weight ratio of the alkali metal hydroxide to the cellulose in the alkali cellulose is usually from 0.01 to 2.0, preferably from 0.5 to 1.5. When the weight ratio is less than 0.01, the degree of substitution of the ether groups may be reduced and thereby deteriorate the transparency of the resulting cellulose ether solution, making the solution unsuitable for use in film coating. When the weight ratio is more than 2.0, the reaction efficiency of etherification in a later step may be reduced owing to the excess alkali.

After the alkali cellulose is produced, it may be brought into contact with an etherifying agent for an etherification reaction in a conventional manner to obtain a crude water-soluble cellulose ether having a high degree of polymerization. Examples of the water-soluble cellulose ether having a high degree of polymerization include methyl cellulose, hydroxypropylmethyl cellulose, hydroxyethylmethyl cellulose and hydroxypropyl cellulose.

The etherifying agent useful for the production of the water-soluble cellulose ether having a high degree of polymerization is known and not particularly limited. Examples thereof include methyl chloride, propylene oxide, and ethylene oxide.

The crude water-soluble cellulose ether having a high degree of polymerization obtained by the etherification reaction may then be purified and dried in a conventional manner to obtain a water-soluble cellulose ether having a high degree of polymerization.

A purifying method and an apparatus for purification are not particularly limited. From the standpoint of a cost, washing may be carried out preferably with water, more preferably with hot water (preferably of from 85 to 100° C.). Ash content in the water-soluble cellulose ether having a high degree of polymerization after washing is preferably less than 0.5% by weight. When the ash content is more than 0.5% by weight, whiteness of a water-soluble cellulose ether having a low degree of polymerization obtained in a later step may be reduced because of insufficient removal of yellowing-causing substance or substances generated in the alkali cellulose production step and/or etherification reaction step.

A drying method and an apparatus for drying are not particularly limited. The temperature of the water-soluble cellulose ether having a high degree of polymerization during drying is preferably from 40 to 80° C. When the temperature is less than 40° C., the productivity may be reduced because of an increase in drying time. When the temperature is more than 80° C., whiteness of the water-soluble cellulose ether having a low degree of polymerization obtained in a later step may be reduced.

The viscosity at 20° C. of an aqueous 2% by weight solution of the water-soluble cellulose ether having a high degree of polymerization obtained after the steps of purifying and drying is preferably more than 20 mPa·s, more preferably from 50 to 3000 mPa·s, still more preferably from 100 to 2000 mPa·s, particularly preferably 500 to 1700 mPa·s. The viscosity at 20° C. of an aqueous 2% by weight solution of the water-soluble cellulose ether having a high degree of polymerization, when it is 600 mPa·s or more, can be measured using a Brookfield viscometer in accordance with JIS Z8803, while when it is less than 600 mPa·s, can be measured using an Ubbellohde viscometer in accordance with JIS K2283-1993.

After completion of drying, the water-soluble cellulose ether having a high degree of polymerization may be ground into a predetermined size. A grinding method of the water-soluble cellulose ether having a high degree of polymerization and an apparatus for grinding are not particularly limited. A grinding system permitting completion of grinding in a short period of time is preferred. When the powder stays in a grinder for long hours, whiteness of a water-soluble cellulose ether having a low degree of polymerization obtained in a later step may be reduced. Examples of the grinder permitting completion of grinding in a short period of time include an impact grinder such as Turbo Mill (produced by Turbo Kogyo Co., Ltd.), PPSR (produced by Pallmann) and Victory Mill (produced by Hosokawa Micron Corporation).

The ground water-soluble cellulose ether having a high degree of polymerization has a volume-average particle size ($D_{50}$) of preferably not greater than 150 μm, more preferably from 20 to 100 μm, still more preferably from 30 to 70 μm, from the standpoint of control of uniform depolymerization. The volume-average particle size means an average particle size in terms of volume, can be calculated by the equation $\{\Sigma(nD^3)/\Sigma n\}^{1/3}$ as described, for example, in "Kaitei Zoho Funtai Bussei Zusetsu" ("revised and enlarged edition of Illustration of Powder Physical Properties") edited by The Society of Powder Technology, Japan and The Association of Powder Method Industry and Engineering, Japan, published by Nikkei Gijutsu Tosho, 1985, p 88. In the equation, D is a particle diameter, n is the number of particles having said particle diameter, and $\Sigma n$ is a total number of particles. $D_{50}$ means a particle size at 50% (average particle diameter) in the cumulative particle size distribution, and can be measured by using dry laser diffraction. The volume-average particle size can be measured by subjecting a powder sample blown by means of compressed air to a laser beam, and measuring a diffraction intensity thereof, for example, with "Mastersizer 3000" produced by Malvern Instruments, UK, or "HELOS" produced by Sympatec, Germany.

The water-soluble cellulose ether powder having a high degree of polymerization after the step of grinding is depolymerized into a water-soluble cellulose ether having a low degree of polymerization. The depolymerization includes a depolymerization through hydrolysis in the presence of an acid catalyst, and a depolymerization through oxidative decomposition in the presence of an oxidizing agent. The depolymerization through hydrolysis in the presence of an acid catalyst is more preferred.

Preferred examples of the acid to be used for the depolymerization through hydrolysis in the presence of an acid catalyst include an inorganic acid such as hydrochloric acid, sulfuric acid, nitric acid and phosphoric acid. The acid may be used singly or as a mixture of two or more acids. In particular, hydrochloric acid is preferred from the standpoint of safety of a salt formed when the acid is neutralized.

The acid may be added to the system in gas form or in solution form. The acid is preferably added in solution form. The acid is added in an amount of preferably from 0.1 to 3.0% by weight, more preferably from 0.15 to 1.5% by weight, each based on the weight of the cellulose ether. When the amount is more than 3.0% by weight, whiteness of the water-soluble cellulose ether having a low degree of polymerization may be reduced. When the amount is less than 0.1% by weight, a period of time required for the depolymerization may be extended.

Depolymerization through oxidative decomposition may be carried out by adding an oxidizing agent to the system before, during, and/or after the depolymerization through hydrolysis in the presence of the acid catalyst. Preferred examples of the oxidizing agent to be used for depolymerization through oxidative decomposition in the presence of an oxidizing agent include hydrogen peroxide and a salt thereof and the other peroxide compounds such as sodium persulfate, perborates, sodium chlorite, halogens and halogen compounds. Hydrogen peroxide is more preferred. The oxidizing agent is added in an amount of preferably from 0.01 to 10% by weight, more preferably from 0.02 to 5.0% by weight based on the weight of the cellulose ether.

Addition of the optimum amount of the oxidizing agent to the system may enhance whiteness of the water-soluble cellulose ether having a low degree of polymerization obtained by depolymerization. However, according to the invention, addition of the oxidizing agent to the system is not always necessary for the production of the water-soluble cellulose ether having a low degree of polymerization and high whiteness.

The internal temperature during depolymerization is preferably from 50 to 130° C., more preferably from 60 to 110° C., still more preferably from 60 to 90° C. When the internal temperature is more than 130° C., whiteness of the water-soluble cellulose ether having a low degree of polymerization may decrease. When the internal temperature is less than 50° C., a time required for the depolymerization treatment may be extended.

The depolymerization time is preferably selected based on the viscosity at 20° C. of an aqueous 2% by weight solution of the water-soluble cellulose ether having a high degree of polymerization before depolymerization, the viscosity of the water-soluble cellulose ether having a low degree of polymerization after depolymerization, and depolymerization operating conditions.

The acid catalyst present in the system after depolymerization is preferably removed as much as possible. Removal from the system is performed preferably by removal of an acid catalyst-containing gas present in the system by using an apparatus such as vacuum pump. Control of the degree of polymerization by depolymerization may become difficult without removal of the acid catalyst.

The viscosity at 20° C. of an aqueous 2% by weight solution of the water-soluble cellulose ether having a low degree of polymerization obtained by depolymerization is preferably 20 mPa·s or less, more preferably 2 to 18 mPa·s, still more preferably 3 to 15 mPa·s. When the viscosity is more than 20 mPa·s, handling may become difficult owing to an increase in solution viscosity during film coating. The viscosity of the water-soluble cellulose ether having a low degree of polymerization can be measured using an Ubbelohde viscometer in accordance with JIS K2283-1993.

A reduction ratio in viscosity after depolymerization is not particularly limited, and is preferably from 90 to 99.9%, more preferably 95 to 99.9%. The reduction ratio in viscosity after depolymerization can be calculated by {(viscosity prior to depolymerization)−(viscosity after polymerization)}/(viscosity prior to depolymerization)

When the water-soluble cellulose ether having a low degree of polymerization is used as a film coating composition, the water-soluble cellulose ether having a low degree of polymerization may be dissolved in a solvent. The kind of the solvent is not particularly limited as long as it can dissolve therein the water-soluble cellulose ether having a low degree of polymerization. The solvent is preferably an organic solvent, water, or a mixture of an organic solvent and water. The solvent is more preferably purified water in view of safety and environmental consideration.

The content of the cellulose ether in the composition for film coating is preferably from 0.5 to 30% by weight, more preferably from 1 to 20% by weight. When the content is more than 30% by weight, handling may become difficult owing to an increase in the viscosity of the composition for film coating. When the content is less than 0.5% by weight, a long period of time for coating may be required.

The film coating composition may comprise an optional additive. The kind of the additive is not particularly limited. It is preferably selected depending on the application purpose of film coating.

Formulation of the film coating composition is preferably selected, depending on the purpose of its application such as abrasion prevention, improvement in printability, or improvement in impact resistance.

EXAMPLES

The present invention will hereinafter be described in detail by Examples and Comparative Examples. It should not be construed that the present invention is limited by or to them.

Example 1

A pulp sheet of wood pulp made from eucalyptus having an intrinsic viscosity of 650 ml/g was ground with a cutting mill (produced by HORAI Co., Ltd.) to obtain 12.5 kg of pulp powder. The loose bulk density of the pulp powder was measured using a powder tester (produced by Hosokawa Micron Corporation) to be 72 g/L. The weight-average particle size $D_{50}$ of the pulp powder was measured by shifting with the aid of a ro-tap sieve shaker to be 190 µm. Next, the number-average fiber length and the number-average fiber width of the pulp powder were measured using a fiber length analyzer "Kajaani FS300" (produced by Metso Automation). The number-average fiber length was 0.012 mm, the number-average fiber width was 0.15 mm, and the multiplication product of the number-average fiber length and the number-average fiber width was 0.0018 $mm^2$.

A 6.0 kg portion, in terms of cellulose content, of the pulp powder was placed in an internal stirring type pressure-resistant reactor. After vacuuming, 15.4 kg of aqueous 49% by weight sodium hydroxide solution was added to the reactor and the resulting mixture was stirred to obtain an alkali cellulose. Then, 12.4 kg of methyl chloride and 2.8 kg of propylene oxide were added thereto for the reaction, followed by washing, drying, and grinding to obtain hydroxypropylmethyl cellulose having a high degree of polymerization. The volume-average particle size $D_{50}$ at 50% in the cumulative particle size distribution of the hydroxypropylmethyl cellulose having a high degree of polymerization, as determined by laser diffraction/scattering with "Mastersizer 3000" produced by Malvern Instruments, was 49 µm and the viscosity at 20° C. of an aqueous 2% by weight solution thereof was 510 mPa·s.

An aqueous 12% by weight hydrochloric acid solution was added to the hydroxypropylmethyl cellulose having a high degree of polymerization in an amount of 0.030% by weight on basis of the hydroxypropylmethyl cellulose. The temperature was adjusted to give an internal temperature of 75° C. and depolymerization was carried out for 110 minutes. Then, the hydrochloric acid gas from the system was removed to obtain hydroxypropylmethyl cellulose having a low degree of polymerization. The viscosity at 20° C. of an aqueous 2% by weight solution of the hydroxypropylmethyl cellulose having a low degree of polymerization obtained by depolymerization was 5.2 mPa·s, and the pH value of the solution was 6.8. The yellowness index (YI) of the hydroxypropylmethyl cellulose powder having a low degree of polymerization was measured using an SM color computer "SM-T" (produced by Suga Test Instruments Co., Ltd.) to be 8.5. The YI value thus obtained was used as an indicator of whiteness.

Next, an aqueous 6% by weight solution of the hydroxypropylmethyl cellulose having a low degree of polymerization thus obtained was prepared as a coating composition. Each white tablet having a diameter of 6.5 mm and a weight of 120 mg, and comprising mainly lactose and corn starch was coated with 3.6 mg of the coating composition. The coating was carried out using a "NEW HICOATER" (produced by Freund Corporation). The coater had a size of 480 mm and the rotation speed during coating was adjusted to 16 min$^{-1}$. The spraying rate, coating time, and a used amount of the coating solution were 30.0 g/min, 80 minutes, and 2400 g, respectively. The yellowness index of the tablets thus coated was measured using the above-mentioned SM color computer to be 4.3. The results are shown in Table 1.

Example 2

By using a vertical roller mill (produced by IHI Corporation) in the place of the cutting mill, a pulp sheet of wood pulp made from eucalyptus having an intrinsic viscosity of 625 ml/g was ground. The loose bulk density of the pulp powder thus obtained was 105 g/L. The weight-average particle size $D_{50}$ was measured by sifting with the aid of a ro-tap sieve shaker to be 150 μm. Further, the number-average fiber length was 0.012 mm, the number-average fiber width was 0.20 mm, and the multiplication product of the number-average fiber length and the number-average fiber width was 0.0024 mm$^2$.

The pulp powder thus obtained was treated in the same manner as in Example 1 to obtain hydroxypropylmethyl cellulose having a high degree of polymerization. The volume-average particle size $D_{50}$ at 50% in the cumulative particle size distribution of the hydroxypropylmethyl cellulose having a high degree of polymerization, as determined by laser diffraction/scattering with "Mastersizer 3000" produced by Malvern Instruments, was 50 μm and the viscosity at 20° C. of an aqueous 2% by weight solution thereof was 540 mPa·s.

The hydroxypropylmethyl cellulose having a high degree of polymerization was depolymerized in the same manner as in Example 1 to obtain hydroxypropylmethyl cellulose having a low degree of polymerization. The viscosity at 20° C. of an aqueous 2% by weight solution of the hydroxypropylmethyl cellulose having a low degree of polymerization obtained by depolymerization was 5.2 mPa·s and the pH value of the solution was 6.7. The yellowness index of the hydroxypropylmethyl cellulose powder having a low degree of polymerization was measured to be 8.6.

Next, in the same manner as in Example 1, white tablets were coated. The yellowness index of the tablets thus coated was measured to be 4.5. The results are shown in Table 1.

Example 3

In the same manner as in Example 1 except that the opening of the screen of the cutting mill was increased, a pulp sheet of wood pulp made from eucalyptus having an intrinsic viscosity of 625 ml/g was ground. The loose bulk density of the resulting pulp powder was 60 g/L. The weight-average particle size $D_{50}$ was measured by sifting with the aid of a ro-tap sieve shaker to be 225 μm. Further, the number-average fiber length was 0.013 mm, the number-average fiber width was 0.23 mm, and the multiplication product of the number-average fiber length and the number-average fiber width was 0.0030 mm$^2$.

A 4.0 kg portion, in terms of a cellulose content, of the resulting pulp powder was placed in an internal stirring type pressure-resistant reactor. After vacuuming, 10.3 kg of an aqueous 49% by weight sodium hydroxide solution was added to the reactor and the resulting mixture was stirred to obtain an alkali cellulose. Then, 8.27 kg of methyl chloride and 1.87 kg of propylene oxide were added thereto for the reaction, followed by washing, drying, and grinding to obtain hydroxypropylmethyl cellulose having a high degree of polymerization. The volume-average particle size $D_{50}$ at 50% in the cumulative particle size distribution of the hydroxypropylmethyl cellulose having a high degree of polymerization, as determined by laser diffraction/scattering with "Mastersizer 3000" produced by Malvern Instruments, was 52 μm and the viscosity at 20° C. of an aqueous 2% by weight solution thereof was 755 mPa·s.

The hydroxypropylmethyl cellulose having a high degree of polymerization was then depolymerized in the same manner as in Example 1 to obtain hydroxypropylmethyl cellulose having a low degree of polymerization. The viscosity at 20° C. of an aqueous 2% by weight solution of the hydroxypropylmethyl cellulose having a low degree of polymerization obtained by depolymerization was 5.6 mPa·s and the pH value of the solution was 6.8. The yellowness index of the hydroxypropylmethyl cellulose powder having a low degree of polymerization was measured to be 9.0.

Next, in the same manner as in Example 1, the white tablets were coated. The yellowness index of the tablets thus coated was 4.9. The results are shown in Table 1.

Example 4

In the same manner as in Example 1, a pulp sheet of wood pulp made from spruce having an intrinsic viscosity of 830 ml/g was ground. The loose bulk density of the pulp powder thus obtained was 120 g/L. The weight-average particle size $D_{50}$ was measured by sifting with the aid of a ro-tap sieve shaker to be 95 μm. Further, the number-average fiber length was 0.020 mm, the number-average fiber width was 0.19 mm, and the multiplication product of the number-average fiber length and the number-average fiber width was 0.0038 mm$^2$.

The pulp powder thus obtained was treated in the same manner as in Example 1 to obtain hydroxypropylmethyl cellulose having a high degree of polymerization. The volume-average particle size $D_{50}$ at 50% in the cumulative particle size distribution of the hydroxypropylmethyl cellulose having a high degree of polymerization, as determined by laser diffraction/scattering with "Mastersizer 3000" produced by Malvern Instruments, was 53 μm and the viscosity at 20° C. of an aqueous 2% by weight solution was 1510 mPa·s.

The hydroxypropylmethyl cellulose having a high degree of polymerization was depolymerized in the same manner as in Example 1 to obtain hydroxypropylmethyl cellulose having a low degree of polymerization. The viscosity at 20° C. of an aqueous 2% by weight solution of the hydroxypropylmethyl cellulose having a low degree of polymerization obtained by depolymerization was 5.2 mPa·s and the pH value of the solution was 6.9. The yellowness index of the hydroxypropylmethyl cellulose powder having a low degree of polymerization was measured to be 8.5.

Next, in the same manner as in Example 1, the white tablets were coated. The yellowness index of the tablets thus coated was 4.6. The results are shown in Table 1.

Comparative Example 1

In the same manner as in Example 3 except that a pulp sheet of wood pulp made from spruce having an intrinsic viscosity of 830 ml/g was ground. The loose bulk density of the pulp powder thus obtained was 71 g/L. The weight-average particle size $D_{50}$ was measured by sifting with the aid of a ro-tap sieve shaker to be 160 µm. Further, the number-average fiber length was 0.021 mm, the number-average fiber width was 0.229 mm, and the multiplication product of the number-average fiber length and the number-average fiber width was 0.0048 mm².

The pulp powder thus obtained was treated in the same manner as in Example 1 to obtain hydroxypropylmethyl cellulose having a high degree of polymerization. The volume-average particle size $D_{50}$ at 50% in the cumulative particle size distribution of the hydroxypropylmethyl cellulose having a high degree of polymerization, as determined by laser diffraction/scattering with "Mastersizer 3000" produced by Malvern Instruments, was 51 µm and the viscosity at 20° C. of an aqueous 2% by weight solution was 1950 mPa·s.

The hydroxypropylmethyl cellulose having a high degree of polymerization was depolymerized in the same manner as in Example 1 to obtain hydroxypropylmethyl cellulose having a low degree of polymerization. The viscosity at 20° C. of an aqueous 2% by weight solution of the hydroxypropylmethyl cellulose having a low degree of polymerization obtained by depolymerization was 5.5 mPa·s and the pH value of the solution was 6.6. The yellowness index of the hydroxypropylmethyl cellulose powder having a low degree of polymerization was measured to be 9.6.

Next, in the same manner as in Example 1, the white tablets were coated. The yellowness index of the tablets thus coated was 5.8. The results are shown in Table 1.

Comparative Example 2

In the same manner as in Example 3 except that a pulp sheet of slash pine having an intrinsic viscosity of 790 ml/g was used, the pulp sheet was ground. The loose bulk density of the pulp powder thus obtained was 99 g/L. The weight-average particle size $D_{50}$ was measured by sifting with the aid of a ro-tap sieve shaker to be 120 µm. Further, the number-average fiber length was 0.027 mm, the number-average fiber width was 0.248 mm, and the multiplication product of the number-average fiber length and the number-average fiber width was 0.0067 mm².

The pulp powder thus obtained was treated in the same manner as in Example 1 to obtain hydroxypropylmethyl cellulose having a high degree of polymerization. The volume-average particle size $D_{50}$ at 50% in the cumulative particle size distribution of the hydroxypropylmethyl cellulose having a high degree of polymerization, as determined by laser diffraction/scattering with "Mastersizer 3000" produced by Malvern Instruments, was 49 µm and the viscosity at 20° C. of an aqueous 2% by weight solution thereof was 1750 mPa·s.

The hydroxypropylmethyl cellulose having a high degree of polymerization was depolymerized in the same manner as in Example 1 to obtain hydroxypropylmethyl cellulose having a low degree of polymerization. The viscosity at 20° C. of an aqueous 2% by weight solution of the hydroxypropylmethyl cellulose having a low degree of polymerization obtained by depolymerization was 5.3 mPa·s, and the pH value of the solution was 6.7. The yellowness index of the hydroxypropylmethyl cellulose powder having a low degree of polymerization was measured to be 10.5.

Next, in the same manner as in Example 1, the white tablets were coated. The yellowness index of the tablets thus coated was 6.1. The results are shown in Table 1.

Comparative Example 3

In the same manner as in Example 3 except that a pulp sheet of slash pine having an intrinsic viscosity of 590 ml/g was used, the pulp sheet was ground. The loose bulk density of the pulp powder thus obtained was 105 g/L. The weight-average particle size $D_{50}$ was measured by sifting with the aid of a ro-tap sieve shaker to be 110 µm. Further, the number-average fiber length was 0.027 mm, the number-average fiber width was 0.207 mm, and the multiplication product of the number-average fiber length and the number-average fiber width was 0.0056 mm².

The pulp powder thus obtained was treated in the same manner as in Example 1 to obtain hydroxypropylmethyl cellulose having a high degree of polymerization. The volume-average particle size $D_{50}$ at 50% in the cumulative particle size distribution of the hydroxypropylmethyl cellulose having a high degree of polymerization, as determined by laser diffraction/scattering with "Mastersizer 3000" produced by Malvern Instruments, was 55 µm and the viscosity at 20° C. of an aqueous 2% by weight solution was 650 mPa·s.

The hydroxypropylmethyl cellulose having a high degree of polymerization was depolymerized in the same manner as in Example 1 to obtain hydroxypropylmethyl cellulose having a low degree of polymerization. The viscosity at 20° C. of an aqueous 2% by weight solution of the hydroxypropylmethyl cellulose having a low degree of polymerization obtained by depolymerization was 5.3 mPa·s, and the pH value of the solution was 6.7. The yellowness index of the hydroxypropylmethyl cellulose powder having a low degree of polymerization was measured to be 11.5.

Next, in the same manner as in Example 1, the white tablets were coated. The yellowness index of the tablets thus coated was 6.9. The results are shown in Table 1.

TABLE 1

| | | pulp powder | | | |
| --- | --- | --- | --- | --- | --- |
| | type of pulp | intrinsic viscosity of pulp before grinding (ml/g) | (number-average fiber length) times (number-average-fiber width) (mm²) | loose bulk density (g/L) | weight-average particle size (µm) |
| Example 1 | eucalyptus | 650 | 0.0018 | 72 | 190 |
| Example 2 | eucalyptus | 625 | 0.0024 | 105 | 150 |
| Example 3 | eucalyptus | 625 | 0.0030 | 60 | 225 |

TABLE 1-continued

| | | | | | |
|---|---|---|---|---|---|
| Example 4 | spruce | 830 | 0.0038 | 120 | 95 |
| Comp. Ex. 1 | spruce | 830 | 0.0048 | 71 | 160 |
| Comp. Ex. 2 | slash pine | 790 | 0.0067 | 99 | 120 |
| Comp. Ex. 3 | slash pine | 590 | 0.0056 | 105 | 110 |

| | HPMC having high degree of polymerization | | HPMC having low degree of polymerization | | |
|---|---|---|---|---|---|
| | volume-average particle size (μm) | viscosity at 20° C. of aqueous 2 wt % solution (mPa·s) | viscosity at 20° C. of aqueous 2 wt % solution (mPa·s) | yellowness index | yellowness index of tablets *1 |
| Example 1 | 49 | 510 | 5.2 | 8.5 | 4.3 |
| Example 2 | 50 | 540 | 5.2 | 8.6 | 4.5 |
| Example 3 | 52 | 755 | 5.6 | 9.0 | 4.9 |
| Example 4 | 53 | 1510 | 5.2 | 8.5 | 4.6 |
| Comp. Ex. 1 | 51 | 1950 | 5.5 | 9.6 | 5.8 |
| Comp. Ex. 2 | 49 | 1750 | 5.3 | 10.5 | 6.1 |
| Comp. Ex. 3 | 55 | 650 | 5.3 | 11.5 | 6.9 |

*1: Yellowness index of tablets coated with HPMC (hydroxypropylmethyl cellulose) having a low degree of polymerization is presented.

The invention claimed is:

1. A method for producing a water-soluble cellulose ether having a low degree of polymerization, comprising the steps of:
bringing a pulp powder having a multiplication product of less than .004 mm² which is obtained by multiplying a number-average fiber length by a number-average fiber width each measured with a fiber length analyzer, into contact with an alkali metal hydroxide to obtain an alkali cellulose;
reacting the alkali cellulose with an etherifying agent to obtain a crude water-soluble cellulose ether having a high degree of polymerization;
purifying the crude water-soluble cellulose ether having a high degree of polymerization to obtain a purified water-soluble cellulose ether having a high degree of polymerization;
drying the purified water-soluble cellulose ether having a high degree of polymerization to obtain a dried water-soluble cellulose ether having a high degree of polymerization;
grinding the dried water-soluble cellulose ether having a high degree of polymerization into a water-soluble cellulose ether powder having a high degree of polymerization; and
depolymerizing the water-soluble cellulose ether powder having a high degree of polymerization to obtain the water-soluble cellulose ether having a low degree of polymerization.

2. The method for producing a water-soluble cellulose ether having a low degree of polymerization according to claim 1, wherein the pulp powder is derived from eucalyptus.

3. The method for producing a water-soluble cellulose ether having a low degree of polymerization according to claim 1, wherein the pulp powder has been obtained by grinding a pulp having an intrinsic viscosity of less than 900 ml/g.

4. The method for producing a water-soluble cellulose ether having a low degree of polymerization according to claim 1, wherein the pulp powder has a loose bulk density of from 70 to 300 g/l.

5. The method for producing a water-soluble cellulose ether having a low degree of polymerization according to claim 1, wherein the pulp powder has a weight-average particle size $D_{50}$ of not greater than 250 μm as measured by sifting with a ro-tap sieve shaker.

6. The method for producing a water-soluble cellulose ether having a low degree of polymerization according to claim 1, wherein a viscosity at 20° C. of an aqueous 2% by weight solution of the cellulose ether having a low degree of polymerization thus obtained is not greater than 20 mPa·s.

7. The method for producing a water-soluble cellulose ether having a low degree of polymerization according to claim 1, wherein a viscosity at 20° C. of an aqueous 2% by weight solution of the cellulose ether having a low degree of polymerization thus obtained is from 3 to 15 mPa·s.

8. The method for producing a water-soluble cellulose ether having a low degree of polymerization according to claim 1, wherein the pulp powder has a multiplication product of greater than 0.001 mm².

9. The method for producing a water-soluble cellulose ether having a low degree of polymerization according to claim 1, wherein the pulp powder has a number-average fiber length from 0.05 to 0.6 mm.

10. The method for producing a water-soluble cellulose ether having a low degree of polymerization according to claim 1, wherein the pulp powder has a number-average fiber width from 0.005 to 0.050 mm.

11. The method for producing a water-soluble cellulose ether having a low degree of polymerization according to claim 1, wherein the concentration of alkali metal hydroxide in the alkali metal hydroxide solution is from 10 to 60% by weight.

12. The method for producing a water-soluble cellulose ether having a low degree of polymerization according to claim 1, wherein a viscosity at 20° C. of an aqueous 2% by weight solution of the dried water-soluble cellulose ether having a high degree of polymerization is from 50 to 3000 mPa·s.

13. The method for producing a water-soluble cellulose ether having a low degree of polymerization according to claim 1, wherein purifying the crude water-soluble cellulose ether having a high degree of polymerization comprises washing the crude water-soluble cellulose ether having a high degree of polymerization to an ash content of less than 0.5% by weight.

14. The method for producing a water-soluble cellulose ether having a low degree of polymerization according to claim 1, wherein depolymerizing the water-soluble cellulose ether powder having a high degree of polymerization comprises adding hydrochloric acid, sulfuric acid, nitric acid, phosphoric acid, or combinations thereof.

15. A method for producing a film coating composition, comprising the respective steps of the method for producing a water-soluble cellulose ether having a low degree of polymerization as claimed in claim 1 and further comprising a step of dissolving the produced water-soluble cellulose ether having a low degree of polymerization in a solvent.

16. The method for producing a film coating composition according to claim 15, wherein a content of the cellulose ether in the composition for film coating is from 0.5 to 30% by weight.

* * * * *